United States Patent [19]

Cerutti

[11] Patent Number: 4,755,070
[45] Date of Patent: Jul. 5, 1988

[54] CIRCUIT FOR ACTUATING ELECTRIC MOTORS, ESPECIALLY IN AN ELECTRONIC TYPEWRITER

[75] Inventor: Walter Cerutti, Ivrea, Italy

[73] Assignee: Ing. C. Olivetti & C., S.p.A., Ivrea, Italy

[21] Appl. No.: 795,165

[22] Filed: Nov. 5, 1985

[30] Foreign Application Priority Data

Nov. 5, 1984 [IT] Italy .................. 68096 A/84

[51] Int. Cl.4 .............................................. B41J 1/22
[52] U.S. Cl. ................................... 400/144.2; 400/70;
400/320; 400/568; 318/594
[58] Field of Search .................... 400/70, 144.2, 320,
400/322, 568, 569, 692, 175; 340/347 P;
200/51.1; 318/594

[56] References Cited

U.S. PATENT DOCUMENTS

| 3,954,163 | 5/1976 | Gabor ........................ 400/144.2 |
| 4,030,591 | 6/1977 | Martin et al. ............... 400/144.2 X |
| 4,091,911 | 5/1978 | Chang et al. ................ 400/144.2 X |
| 4,118,129 | 10/1978 | Grundherr ................... 400/144.2 |
| 4,226,546 | 10/1980 | Hoffman ..................... 400/144.2 |
| 4,236,838 | 12/1980 | Guerrini ..................... 400/175 X |
| 4,307,967 | 12/1981 | Araki et al. ................. 400/144.2 |
| 4,324,499 | 4/1982 | Giacone ...................... 400/144.2 |
| 4,349,770 | 9/1982 | Ragen ........................ 400/144.2 X |
| 4,388,010 | 6/1983 | Mott et al. .................. 400/692 |
| 4,405,245 | 9/1983 | Fukushima .................... 400/144.2 |
| 4,440,512 | 4/1984 | Forcier ...................... 400/144.2 |
| 4,496,835 | 1/1985 | Boella et al. ................ 340/347 P X |
| 4,605,887 | 8/1986 | Boella et al. ................ 318/594 |
| 4,685,887 | 8/1987 | Hanning ...................... 200/51.1 X |

FOREIGN PATENT DOCUMENTS 0110632 6/1984 European Pat. Off. ............ 400/692
0115869 7/1984 Japan .......................... 400/692

OTHER PUBLICATIONS

IBM Technical Disclosure Bulletin, "Electrical Connections in a Modularized Compact Copier", Dodge et al, vol. 25, No. 1, Jun. 1982, pp. 241-244.

Primary Examiner—Ernest T. Wright, Jr.
Attorney, Agent, or Firm—Banner, Birch, McKie & Beckett

[57] ABSTRACT

In an electronic typewriter having a printing device of the daisywheel type, the direct current electric motors which control the rotation of the character-carrying element, the movement of the carriage along the various printing positions and the rotation of the platen roller for line spacing are associated with corresponding transducers which detect the angular position thereof, and are actuated by a single integrated circuit connected to a microprocessor by an address and data bus (43). The microprocessor determines, for each of the motors, the angular amplitude of the rotary movement and the time required to cover each of the elementary angular distances, in accordance with a given speed law and addresses with data, including the said time, a plurality of circuit modules (B1, B2, B3) individual to the motors. The modules issue motor command signals (e.g. M11, M21, M31). Checking as between the actual speed and the desired or theoretical speed is effected by the modules of the integrated circuit using the timing signals (e.g. STA 1, STB 1) generated by the transducers connected to the motors. The modules send back interrupt signals (INT 1, INT 2, INT 3) which provide interrupt vectors (46) for the microprocessor, enabling the microprocessor to determine the new data to be sent to the modules.

14 Claims, 9 Drawing Sheets

CIRCUIT FOR ACTUATING ELECTRIC MOTORS, ESPECIALLY IN AN ELECTRONIC TYPEWRITER

BACKGROUND OF THE INVENTION

The present invention relates to a circuit for actuating one or more electric motors, especially the electric motors of an electronic typewriter. Such a typewriter has a platen roller, a carriage which is movable parallel to the platen roller and a printing device which is mounted on the carriage and which is operable to select the character to be printed. Movement of the carriage, selection of the character to be printed and rotation of the platen roller are produced by three electric direct current motors with which there are associated the same number of transducers which detect their rotary movement and generate corresponding electrical signals.

An arrangement for controlling the speed and positioning of an electric motor of a typewriter is known, wherein a microprocessor, on the basis of the amplitude of the rotary movement that the motor is to produce, generates logic signals which are suitably processed by an actuation circuit to accelerate and brake or short-circuit the motor. In that arrangement, for each unitary distance that the motor is to cover on the basis of a table of prerecorded times, the microprocessor determines a theoretical time for converging the respective distance and compares it to the actual time taken by the motor in order to determine if the motor is to be accelerated or braked or short-circuited. Such an arrangement is effective, but since the microprocessor also controls the specific printing and editing features of the typewriter its time response is rather low. This result is especially disadvantageous in view of the fact that the microprocessor must control all the motors of the typewriter.

SUMMARY OF THE INVENTION

The object of the present invention is to provide a circuit which is capable of actuating, in real time and under the control of a single microprocessor, at least an electric motor of a typewriter.

In accordance with this object, the circuit according to the invention comprises a circuit module comprising memory means for storing the value of a theoretical time TR, timing means responsive to position signals for determining an effective time TE for performing an elementary rotary movement and comparison means for comparing the effective time TE with the theoretical time TR, means for generating a corresponding interrupt signal for the microprocessor, and data addressing means for directing data processed by the microprocessor to said circuit module.

BRIEF DESCRIPTION OF THE DRAWING

The invention will now be described in more detail, by way of example, and with reference to the accompanying drawings, in which.

DESCRIPTION OF THE PREFERRED EMBODIMENT

An electronic circuit 20 (FIGS. 1 and 2) is operable to control the direct current motors 21, 22 and 23 of a typewriter 25 which comprises a keyboard 26, a platen roller 27, a carriage 28 which is movable on guides 29 parallel to the platen roller 27 and a character-carrying disc 30 having flexible blades, of the 'daisywheel' type, for example of the type described in U.S. Pat. No. 4,236,838 commonly assigned to Ing. C. Olivetti & C. Olivette & C., S.p.A. An inked ribbon 24 is interposed between the character-carrying disc 30 and the roller 27.

Figure 1:
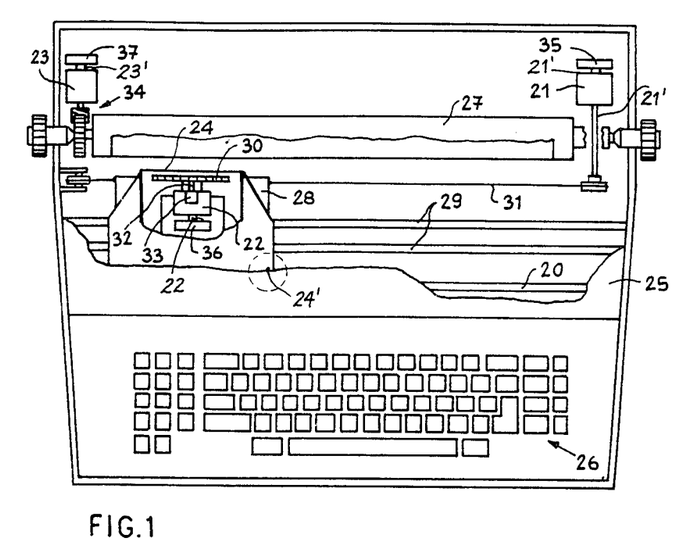
FIG. 1 is a diagrammatic plan view of an electronic typewriter using a circuit embodying the invention.

The electric motor 21 comprises a motor shaft 21' which is connected by means of a metal cable 31 to the carriage 28 for controlling the movement thereof in front of the roller 27 thereby to define the various printing positions along the line of printing.

The electric motor 22 is mounted on the carriage 28 and comprises a motor shaft 22' which is connected to the character-carrying disc 30' for controlling the rotary movement thereof and for positioning the character selected for printing in the striking position. A printing hammer 32 which is also mounted on the carriage 28 is controlled by a solenoid 33 for bringing the character which is selected by the motor 22 against the platen roller 27.

The electric motor 23 comprises a motor shaft 23' which is connected to the platen roller 27 by means of an endless worm and gear coupling arrangement 34, and is capable of controlling the rotary movement thereof, for line spacing purposes.

The motors 21, 22 and 23 will be referred to hereinafter as the carriage drive motor, the selection motor and the line spacing motor respectively.

Associated with each of the three motors 21, 22 and 23 is a transducer 35, 36 and 37 for generating respective timing or 'strobe' signals. The transducers 35, 36 and 37 may be for example of the type described in U.S. Pat. No. 4,496,835 commonly assigned to Ing. C. Olivetti & C., S.p.A., and therefore they will not be described in detail herein.

Figure 3:
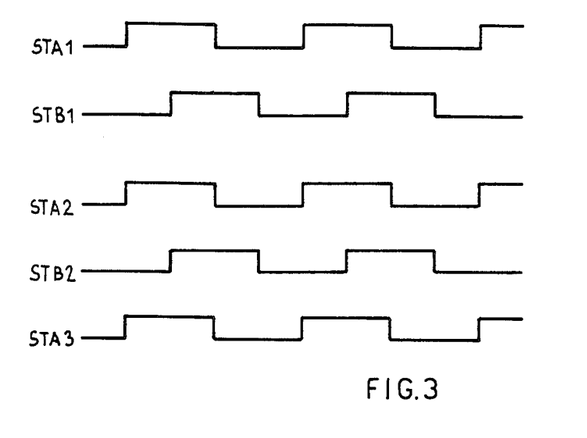
FIG. 3 is a diagram showing the configuration of some electrical signals of the circuit.

Each of the two transducers 35 and 36 is operable to detect the angular positions of the shafts 21 and 22 of the motor 21 and 22 with which it is associated and to generate corresponding logic signals STA 1, STB 1, STA 2, STB 2 respectively, of rectangular shape, which are 90° out of phase with each other (see FIG. 3). The transducer 37 detects the angular position of the shaft 23' of the motor 23 and generates a single signal STA 3 of rectangular shape.

The electronic circuit 20 (see FIG. 2) comprises a microprocessor 40 which may be for example a uPD 7809, from NEC Corporation or a Z8 from ZILOG. The microprocessor 40 is connected to an integrated control circuit 41 within which, in accordance with a feature of the invention, are combined the circuit elements for controlling the three motors 21, 22 and 23. The control circuit 41 is denoted hereinafter by its Italian abbreviation PCU. Interposed between the PCU 41 and the motors 21, 22 and 23 is an actuation and power circuit 42 for the three motors 21, 22 and 23.

Figure 2:
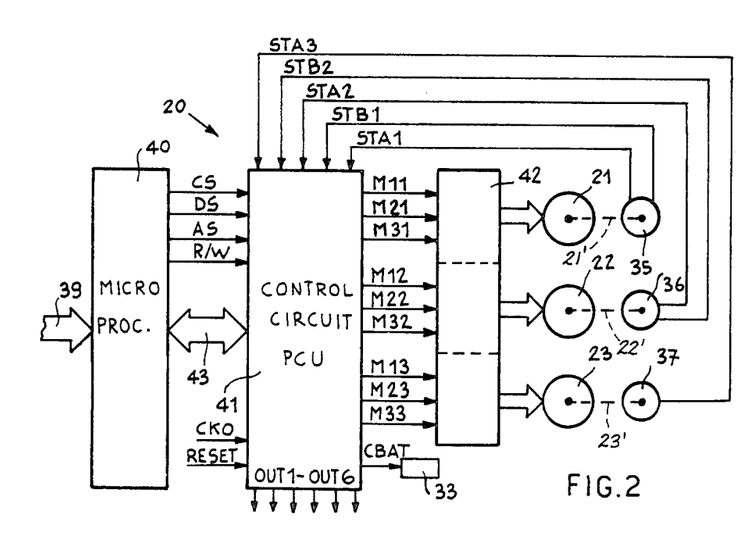
FIG. 2 is a block diagram showing the circuit embodying the invention.

Each motor 21, 22 and 23 is actuated or controlled by the PCU 41 by means of logic signals M11, M21, M31; M12, M22, M32 and M13, M23, and M33 respectively, which signals, addressed to the circuit 42, determine in various combinations various conditions of the motors 21, 22 and 23, for example as illustrated in the following Table:

| M11 | M21 | M31 | |
|-----|-----|-----|--|
| M12 | M22 | M32 | |
| M13 | M23 | M33 | Motor condition |
| 1 | 1 | 1 | Disabled |
| 0 | 1 | 1 | Short-circuited |
| 1 | 0 | 1 | Reverse control = braking |
| 0 | 0 | 1 | Forward control = acceleration |
| 0 | 0 | 0 | Motor stationary on the rising edge of STA with current gain = 1 |
| 1 | 1 | 0 | Motor stationary on the rising edge of STA with a current gain of greater than 1 |
| 1 | 0 | 0 | Motor stationary on the falling edge of STA with a current gain = 1 |
| 0 | 1 | 0 | Motor stationary on the falling edge of STA with a current gain of greater than 1 |

The circuit 42 processes the signals M11–M33 in known manner, for example as described in U.S. Pat. No. 4,605,887 commonly assigned to Ing. C. Olivetti & C., S.p.A. and is therefore not described in detail herein.

As can be seen from the foregoing Table, each motors 21, 22 and 23 may receive four commands to hold it stationary (M31, M32 and M33=0) and as many commands for controlling the rotary movement thereof (M31, M32 and M33=1). In particular, each of motors 21, 22 and 23 may be stopped both at the rising edges and at the falling edges of the strobe signals STA. There are also different stopped conditions: with a current gain of 1, in the case where motors 21, 22 and 23 are already stationary and each is to stay in that position, or with a current gain of greater than 1, in the case where each of the motors 21, 22 and 23 is moving and is to stop as quickly as possible. For the movement commands, there are the following conditions: motor forward or acceleration, motor reverse or braking, motor disabled, and motor short-circuited.

The feed to each motor 21, 22 and 23 is effected in a switching mode, alternating the forward or reverse command with the short-circuit command.

Figure 5:
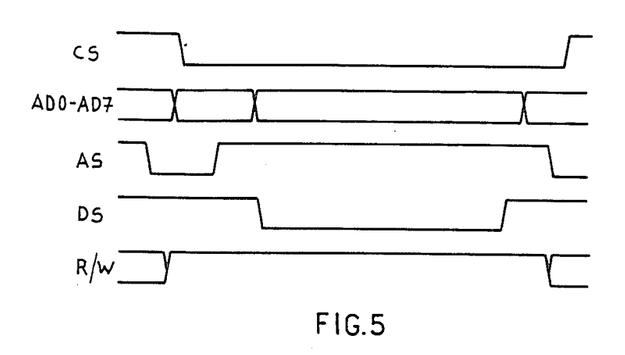
FIG. 5 is a diagram showing the configuration of other electrical signals of the circuit during a cycle of writing data.
Figure 6:
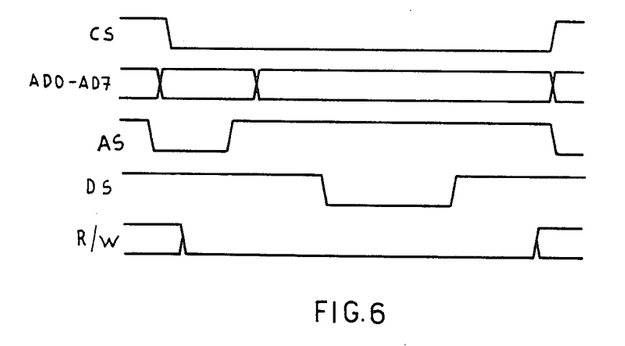
FIG. 6 is a diagram showing the configuration of the signals of FIG. 5 during a cylce of reading data.

The microprocessor 40 and the PCU 41 are operable to exchange data and address information, in multiplex mode, by means of a single 8-bit bus 43 (AD0–AD7); in addition, the microprocessor 40 can supply the PCU 41 with cycle start signals CS, data selection signals DS, address selection signals AS, and read/write signals R/W from and to the PCU 41. An example of the form and the timing of the signals CS, DS, AS, R/W with respect to the data/addresses AD0–AD7 is shown in FIG. 5 for a cycle for writing from the microprocessor 40 to the PCU 41 and in FIG. 6 for a cycle of reading of the microprocessor 40 from the PCU 41.

The microprocessor 40 may be programmed for autonomously processing and controlling the other functions of the typewriter 25, for example the functions of memory, correction and editing on texts to be printed, and the commands of the keyboard 26. Alternatively, the microprocessor 40 may receive external data by way of a bus 39 for processing and controlling the functions of the typewriter 25.

Figure 4:
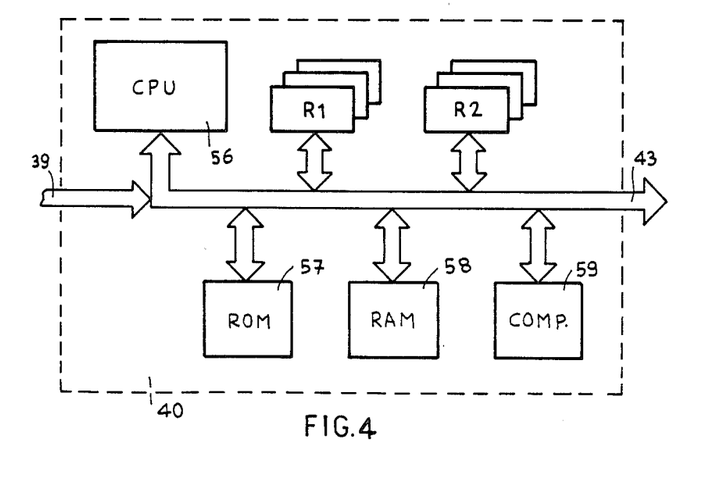
FIG. 4 is a block circuit diagram of a first detail of the circuit shown in FIG. 2.

As shown in FIG. 4, the microprocessor 40 includes inter alia a central unit (CPU) 56, a read only memory (ROM 57), a random access memory (RAM) 58 and, for each motor 21, 22 and 23, a register R1 in which is stored the actual position of the rotor or shafts 21', 22' and 23' of the corresponding motors 21, 22 and 23, a register R2 in which is stored the angular position that the rotor or shaft of 21', 22' and 23' is to reach and a digital comparator 59 for calculating the difference between the values of the registers R1 and R2. Stored in the ROM 57 are the values of the theoretical times TR necessary for effecting each elementary rotation, equal to a given fraction of a revolution, in dependence on the full amplitude of the rotary movement that the rotor 21', 22' and 23' is to produce in order to go from the actual position to the position to be attained, in accordance with a given speed law. For each elementary rotation to be effected, the microprocessor 40 passes to the PCU 41 the value in respect of the theoretical reference time TR together with the information relating to the direction of rotation of the motor DIR.

Within the PCU 41 (see FIG. 7) there are three modules or blocks B1, B2 and B3 for independent control of the three motors 21, 22 and 23. In accordance with the particular embodiment described herein by way of example, the blocks B1 and B2 are capable of controlling motors 21 and 22 associated with transducers 35 and 36 which generate pairs of strobe signals STA and STB, while the block B3 is for controlling a motor 23 associated with a transducer 37 which generates a single strobe signal STA.

Figure 7:
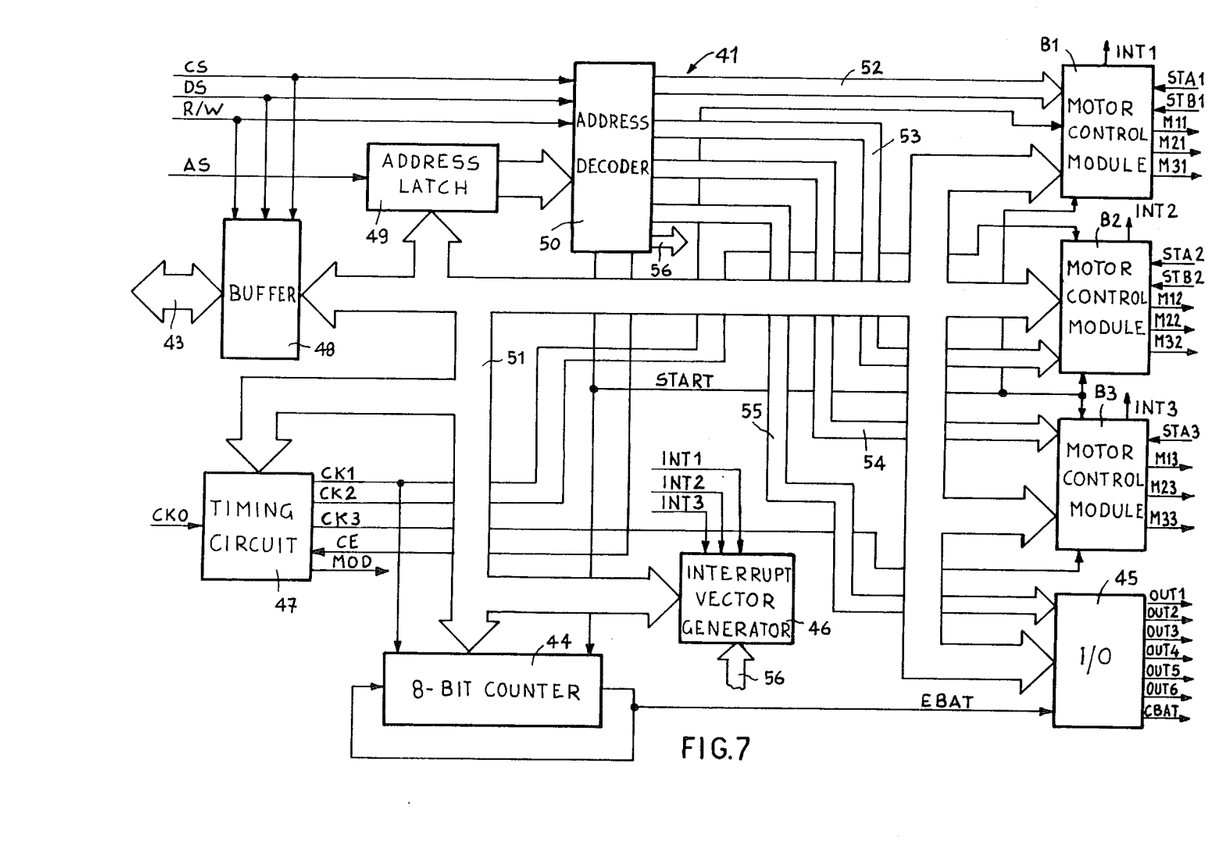
FIG. 7 is a block circuit diagram of a second detail of the circuit shown in FIG. 2.

More precisely, the block B1 receives the signals STA 1 and STB 1 from the transducer 35, and, by means of three signals M11, M21 and M31, controls the carriage drive motor 21, the block B2 receives the signals STA 2 and STB 2 from the transducer 36 and, by means of three signals M12, M22 and M32, controls the selection motor 22, and the block B3 receives the signal STA 3 from the transducer 37 and, by means of three signals M13, M23 and M33, controls the line spacing motor 23.

Also within the PCU 41 are a binary 8-bit counter 44 for counting the time of energisation of the solenoid 33 which controls the printing hammer 32, an input/output gate 45 (I/O) of 6-bit type (OUT 1–OUT 6) and an interrupt vector generator 46 for the microprocessor 40.

It is possible for many devices of the typewriter 25 to be connected to the outputs OUT1–OUT 6, for example an electric motor 24' for controlling the feed movement of the inked ribbon 24 in front of the character-carrying disc 30, an electric motor for controlling automatic paper feed to the platen roller 27, or the like.

The counter 44 is capable of generating a signal EBAT which goes to the gate 45 from which issues the signal CBAT for actuating the solenoid 33.

The PCU 41 further comprises a timing or clock signal generator 47, a bidirectional buffer 48, an address register (address latch) 49 and an address decoder 50. The blocks B1, B2 and B3 and the input/output gate 45 are connected to the elements 44, 46, 47 and 48 and 49 by way of a single internal bus 51. The address decoder 50 is connected to the blocks B1, B2 and B3 by means of buses 52, 53 and 54 respectively, to the input/output gate 45 by way of a bus 55, and to the generator 46 by way of a bus 56. The address decoder 50 further controls the timing generator 47 and the counter 44 by means of signals CE and START, respectively. The timing generator 47 receives at its input a signal CKO at constant frequency, for example 6 MHz, and is programmed to generate three signals CK1, CK2 and CK3 which are at frequencies proportional to that of the signal CKO. For example, the frequency of the signal CK1 may be equal to 1/20, 1/40, 1/80 or 1/160 of the frequency of the signal CKO, the frequency of the signal CK2 may be equal to 1/80 or 1/160 of the frequency of the signal CKO, and the frequency of the signal CK3 may be equal to 1/160 or 1/320 of the frequency of the signal CKO. The ratios between the frequencies of the signal CKO and the signals CK1, CK2 and CK3 are determined by the microprocessor 40.

The blocks B1 and B2 which, as shown above, respectively control the carriage drive motor 21 and the selection motor 22 are identical to each other and only the former of the two is described herein for the sake of brevity.

Figure 8:
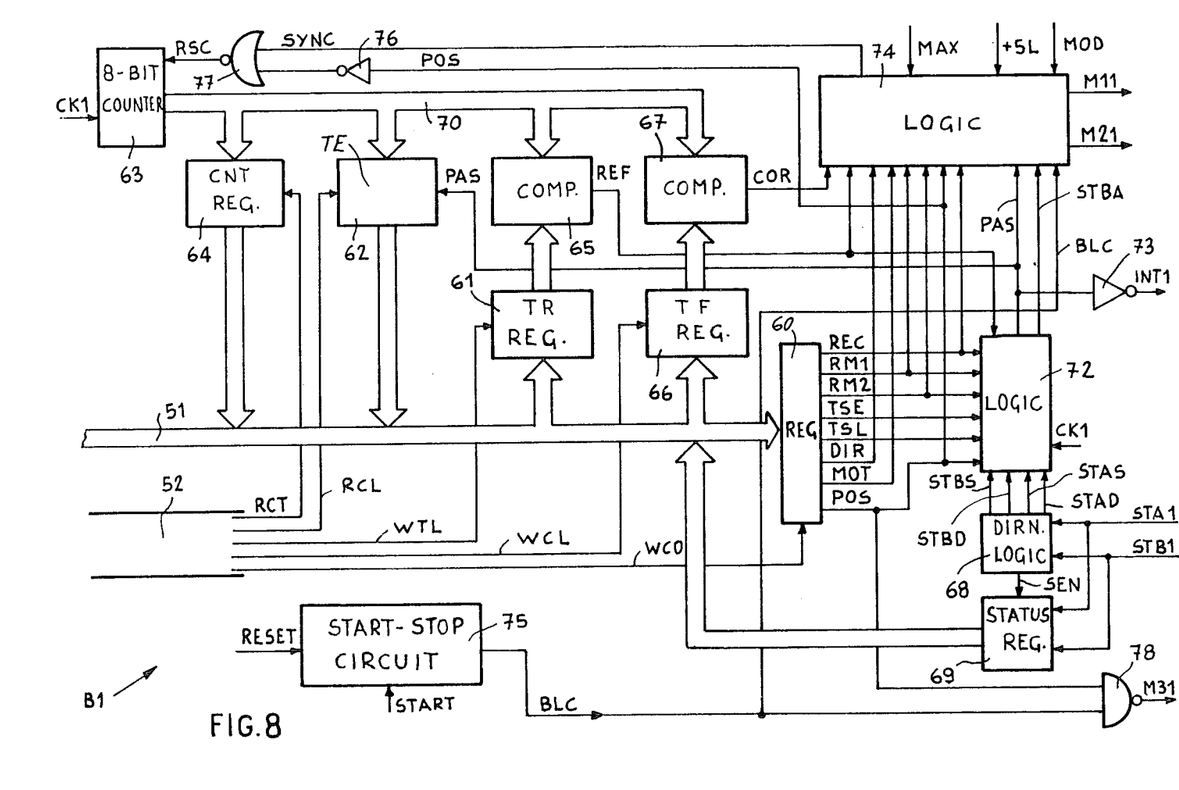
FIG. 8 is a block circuit diagram of a detail from FIG. 7, FIGS. 9 to 11 are block circuit diagrams of details of FIG. 8.
Figure 9:
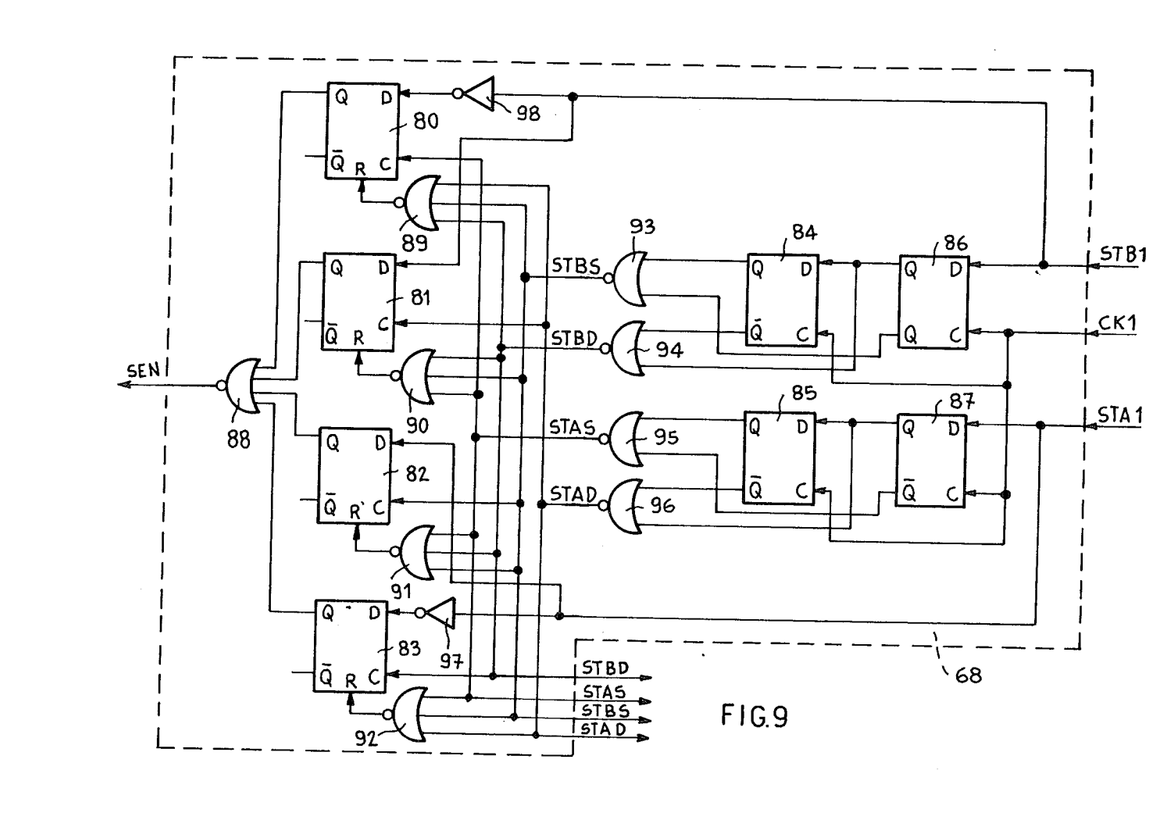

Referring to FIG. 8, the block B1 comprises a register 60 for storing the commands which arrive from the microprocessor 40 by way of the internal bus 51, a register 61 in which is written the theoretical reference time TR calculated by the microprocessor 40 in dependence on the amplitude of the rotary movement to be produced and the speed law, a binary 8-bit counter 63 whose input receives the clock signal CK1 and a zero setting signal RSC associated with the effective time TE taken by the motor 2 of FIG. 1 to produce an elementary rotary movement, a register 64 in which is written the current output value CNT of the counter 63, a register 62 for storing the value TE attained by the counter 63 when it is set to zero by the signal RSC, a first comparator 65 which compares the value of the register 61 to the value of the counter 63, a register 66 in which is written a forcing time TE for possibly correcting the speed of rotation of the motor 21 by accelerating or decelerating same, a second comparator 67 which compares the value of the register 66 to the value of the counter 63, a logic network 68 (FIGS. 8 and 9) which, on the basis of the signals STA 1 and STB 1, generates a signal SEN indicative of the direction in which the motor 21 is rotating, and a status register 69 for storing information relating to the strobes STA 1 and STB 1 and the direction of rotation of the motor 21. The output value CNT of the counter 63 is passed to the registers 62 and 64 and to the comparators 65 and 67 by way of a bus 70.

The logic network 68 (FIG. 9) comprises flip-flops 80–87, NOR-gates 88–96 and two inverters 97 and 98.

A second logic network 72 (see FIGS. 8 and 10) is operable to generate a signal PAS on the basis of logic output signals STAD, STAS, STBD and STBS from the logic network 68 and associated with the strobe signals STA 1 and STB 1 and on the basis of command signals TSE, TSL, REC, RM1, RM2 and POS, from the command register, 60. An output signal REF from the compartor 65 and the clock signal CK1 also pass into the logic network 72. The signal PAS, by way of an inverter 73, generates the interrupt signal INT 1 for the microprocessor 40.

Figure 10:
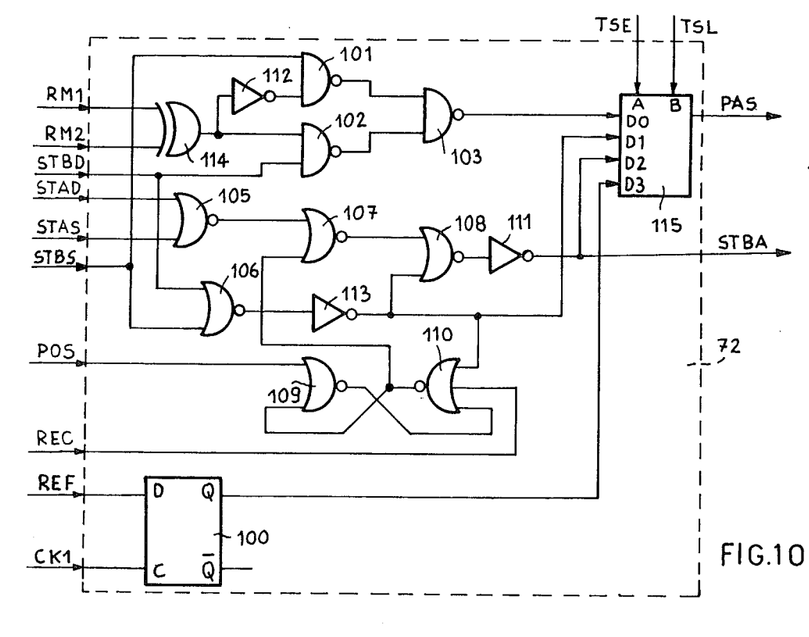

Referring to FIG. 10, the logic network 72 comprises a flip-flop 100, NAND-gates 101–103, NOR-gates 105–110 three inverters 111, 112 and 113, an EX-OR-gate 114 and a multiplexer 115. The logic networks 68 and 72 provide that the signal PAS is generated at the same frequency as the strobe signal STB 1 (see FIG. 12) when the signal TSE and TSL are both at level 0, at a frequency double that of the strobe signal STB 1 when the signal TSE is at level 1 and the signal TSL is at level 0, and finally at a frequency which is four times that of the signal STB 1 when the signal TSE is at level 0 and the signal TSL is at level 1.

Figure 11:
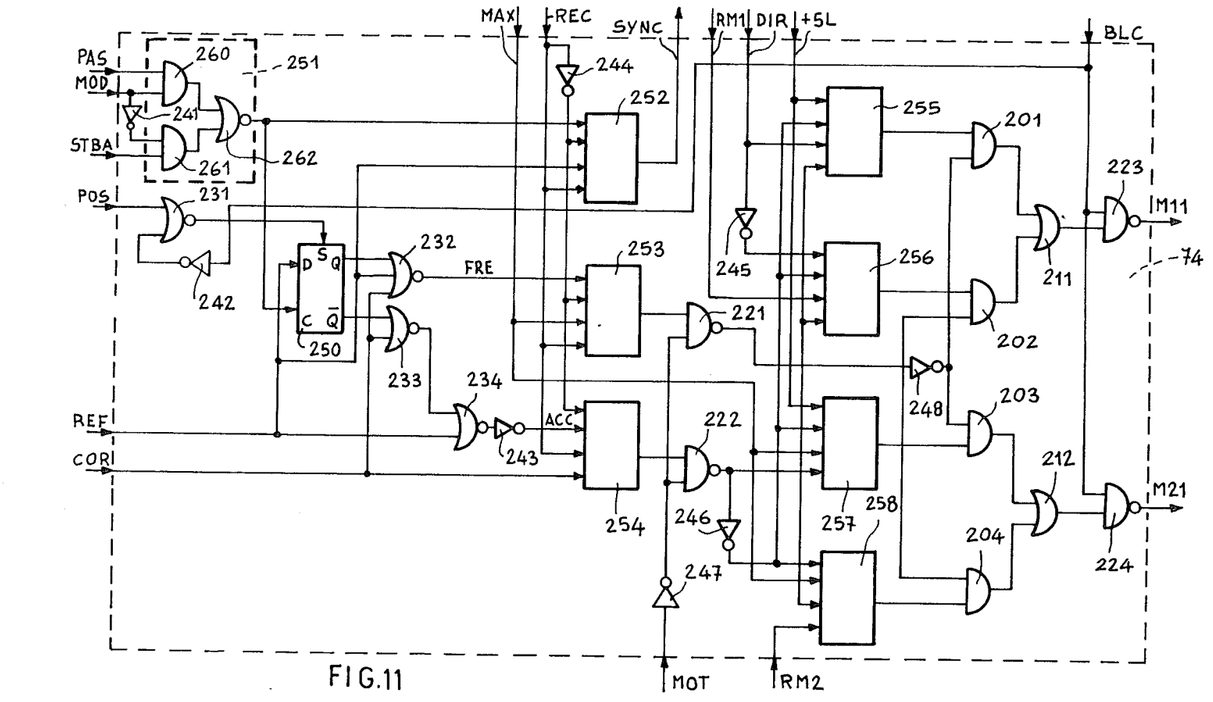

A third logic network 74 (see FIGS. 8 and 11) is operable to generate the signals M11 and M21 and a signal SYNC based on an output signal COR from the comparator 67, the output signal REF from the comparator 65, signals REC, RM1, RM2, DIR, MOT and POS outputted from the command register 60, the signal PAS generated by the logic network 72, a signal STBA which is also an output signal from the logic network 72, a signal MAX which is always at logic level 0, a signal +5L which is always at logic level 1, a signal MOD generated by the generator 47 and a signal BCL generated by a start-stop circuit 75 whose inputs receive the signal START generated by the address decoder 50 (see FIG. 7) and a zeroing signal RESET which is generated externally of the circuit 41.

The logic network 74 (see FIG. 11) comprises AND-gates 201–204, OR-gates 211 and 212, NAND-gates 221–224, NOR-gates 231–234, inverters 241–248, a flip-flop 250 and logic blocks 251–258, each of which comprises two AND-gates 260 and 261 and a NOR-gate 262.

The logic signal MOD which is generated by the generator 47 under the control of the microprocessor 40, on entering the logic network 74, determines the frequency with which the motor 21 is to be controlled. In fact, if the signal MOD is at level 1, the logic block 251 (FIG. 11) enables passage of the signal PAS and disables passage of the signal STBA which corresponds to the sum of the rising and falling edges of the strobe signals STA 1 and STB 1 (FIGS. 9 and 10); in that first case, control of the motor 21 is at the frequency of the signal PAS. If however the signal MOD is at level 0, the same logic block 251 (FIG. 11) disables passage of the signal PAS and enables passage of the signal STBA. In this second situation, control of the motor 21 is at the frequency of STBA which corresponds to one quarter of the period of the strobe signal STA 1. In each case however the microprocessor 40 receives the interrupt signal INT 1 only when the signal PAS is generated.

The registers 60, 61, 62, 64 and 66 are enabled by signals WCO, WTL, RCL, RTC and WCL respectively which reach the block B1 on the bus 52.

The block B1 further comprises a NAND-gate 78 which, combining the output signal POS from the register 60 and the output signal BCL from the circuit 75, generates the actuation signal M31, and an inverter 76 and a NOR-gate 77 which, receiving the signals SYNC and POS at their inputs, generate the signal RSC for setting the counter 63 to zero.

The block B3 is substantially the same as the blocks B1 and B2, with the single difference that, rather than processing two strobes signals which are 90° out of phase with each other, it produces only one thereof (STA 3). It follows therefrom that the signal SEN which is indicative of the direction in which the motor 23 is rotating cannot be generated and that therefore the motor 23 is controlled in an open loop mode, without the possibility of controlling its effective direction of rotation by a feedback signal.

The mode of operation of the circuit 20 described herein before is as follows:

It will be assumed that any one of the carriage drive selection and line spacing functions required for printing a given character at a preselected position is to be performed. By way of example, it will be assumed that the carriage 28 (FIG. 1) is to be displaced along the line of printing of the platen roller 27 and therefore the carriage drive motor 21 is to be rotated starting from its present position which is stored in the register R1 of the microprocessor 40 (FIGS. 2 and 4), to move it towards a given position which it is to attain.

The information relating to the new position to be attained, which is processed by the microprocessor 40 or received thereby on the bus 39 is however stored in the register R2. The microprocessor 40 compares the values of R1 and R2 by means of the comparator 59 and supplies the PCU 41 with information and commands for setting the motor 21 in motion.

In particular, the microprocessor 40, in dependence on the direction of rotation, establishes the level of the signal DIR (level 0=motor forward; level 1=motor reverse), and in dependence on the total amplitude of the rotary movement, establishes whether the signal PAS is to be at the same frequency as STB 1 or is to be at a frequency which is double or four times the latter, and suitably predisposes the command signals TSE and TSL. The microprocessor 40 also computes the value of the theoretical time TR which is to be taken by the motor 21 for performing its first elementary step, or for effecting its first elementary rotary movement.

The microprocessor 40 transfers the address and data information to the PCU 41 by way of the bus 43. The signal CS (FIG. 5) is held at level 0 for the time required for transferring such information, and the signal R/W, if relating to 'writing' to the PCU 41, remains at level 1. The address selection and data selection signals AS and DS respectively determine the content of the information transferred by way of the bus 43.

The block B1 which controls the motor 21 is thus selected, and the value of the time TR is thus transferred to the register 61 of that block. A theoretical value TF for possibly forcing the motor 21, as described hereinbefore, is also written in the register 66.

To start the motor 21, the signal POS is taken from level 1 to level 0 so that the signal M31 (FIG. 8) goes to level 1. The signal M31 at level 1 enables the motor 21 to be controlled in the forward or reverse modes, short-circuited or disabled.

The change of the signal POS from level 1 to level 0 puts the flip-flop 250 (FIG. 11) into the set condition, with the outputs Q=1 and $\overline{Q}$=0. In that way, the signal FRE which conditions the motor 21 in the braking mode remains at level 0 while the signal ACC which conditions the motor 21 in the acceleration mode goes to level 1. The motor 21 is thus predisposed to receive an acceleration command. However, it is the signal DIR whose value is determined by the microprocessor 40, which establishes the direction in which the motor 21 is to begin to rotate. Thus, while the signal M21 is brought to level 0, the signal M11 is brought to level 1 if the motor is to rotate in the forward direction and to level 0 if the motor 21 is to rotate in the reverse direction.

The signals M11, M21 and M31 are processed by the actuation circuit 42 (see FIG. 2) which sets the motor 21 rotating in known fashion.

The counter 63 (see FIG. 8) begins to count the pulses CK1 and passes the result CNT of the counting operation to the registers 62 and 64 and to the comparators 65 and 67 by way of the bus 70.

The comparators 65 and 67 compare the value CNT which progressively increases to the values TR and TF stored in the registers 61 and 66 and they take their outputs REF and COR respectively to level 1 when a condition of coincidence between the values being compared is reached or exceeded.

It will now be assumed that the motor 21 is rotating more slowly than the speed required by the microprocessor 40; that means that, when the theoretical time TR has elapsed, the logic network 72, on the basis of the signals STA 1 and STB 1, has not yet generated a positive pulse of the signal PAS.

Figure 13:
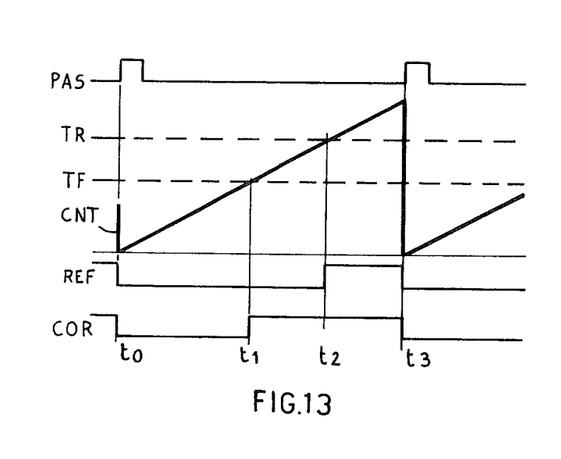
FIG. 13 is a diagram showing the configuration of some signals of the circuit in a first example of operation.

In that case, as shown in FIG. 13, when there is a condition of coincidence between the values of TF and CNT (time $t_1$), the comparator 66 puts the signal COR at level 1 while the comparator 64 puts the signal REF at level 1 when there is a condition of coincidence between the values of TR and CNT (time $t_2$).

When the signal COR is at level 0, the motor 21, by way of the logic network 74 (FIG. 11), can be enabled either to accelerate or to decelerate, being conditioned by the other command signals from the microprocessor 40, by way of the register 60; while if the signal COR is at level 1, it is the signal REF which determines the condition of the motor 21, in fact, if the signal REF is at level 1, the motor 21 is accelerated in every case, while if the signal REF is at level 0 and the signal COR is at level 1, the motor 21 is in the disabled condition (M11 and M21=1). In the situation illustrated in FIG. 13, the motor 21 has been accelerated in the period of time $t_o-t_l$, disabled in the period of time $t_1-t_2$ and accelerated again in the period of time $t_2-t_3$.

At the time $t_3$ when a positive pulse of the signal PAS is generated, the value CNT is stored in the register 64 and the counter 63 is set to zero by the signal RSC.

The signal PAS which is negated by the inverter 73 also acts as an interrupt for the microprocessor 40. The latter, on the basis of the effective time TE elapsed between the time $t_0$ and the time $t_3$, determines the conditions with which the motor 21 is to be conditioned during the subsequent step.

Figure 14:
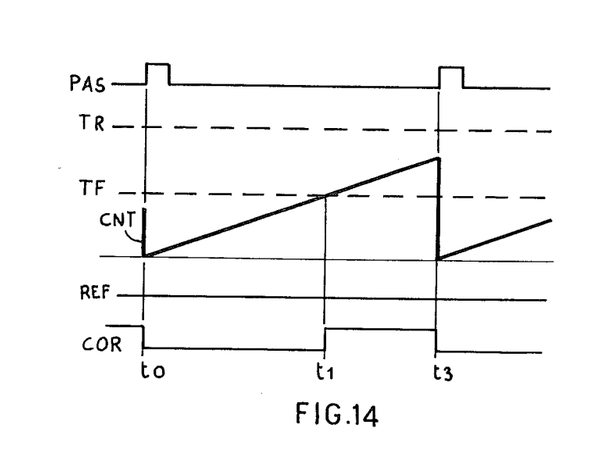
FIG. 14 is a diagram showing the configuration of the signals in FIG. 13, in a second example of operation.

If on the other hand the motor 21 is rotating more quickly than the speed required by the microprocessor 40, a positive pulse of the signal PAS is generated before the theoretical time TR has elapsed. In that case, as illustrated in FIG. 14, the signal REF always remains at level 0 and when the signal COR goes from level 1 to level 0 at the time $t_3$ at which the counter 63 is set to zero by the signal RSC, the motor 21 is conditioned for the braking mode. Therefore, in that second case, the motor is accelerated in the period of time $t_o-t_1$ and disabled in the period of time $t_1-t_3$. The effective time TE being less than the theoretical time TR, the microprocessor 40 will give the motor 21 a deceleration command during the subsequent step.

Besides the operation as described hereinbefore which is that for keeping the motor 21 rotating, the circuit 20 is also operable to command and control other functions.

In particular, if, on comparing the command signal DIR with the signal SEN indicating the actual direction of rotation of the motor 21 which is being controlled, the microprocessor 40 finds that the motor 21 was incorrectly caused to rotate in the opposite direction to the required direction, it is capable of causing the motor 21 to return to the starting position, by producing the signal REC at level 1. In that case, the microprocessor 40 inverts the logic value of the signal DIR, counts the elementary steps that the motor 21 performs in the wrong direction, and causes the motor 21 to return to the rest position. In particular, positive pulses of the signal PAS are generated by means of the logic network 72 (FIG. 10) whenever the signal REF goes from level 0 to level 1. In those circumstances, the value which is written in the register 61 establishes the supply frequency for the return movement of the motor 21, while the value which is written in the register 66 establishes the time at which the commands for the motor 21 are to be interrupted, in accordance with a control method known as PWM (Pulse Width Modulation), until it is restored to the starting position.

As seen hereinbefore, the PCU 41, after having received the command information relating to one of the motors 21, 22 and 23 is capable of directly performing that command until an interrupt signal INT 1, INT 2 or INT 3 is generated. While the PCU 41 is carrying out the command relating to one of the motors 21, 22 and 23, the microprocessor 40 is free to perform other functions, for example to determine if another of the motors 21-23 is also to be set in movement, and to give the appropriate command to the PCU 41. In that case, while for example by means of its block B1 the PCU 41 is performing the command previously received for causing the carriage drive motor 21 to rotate through one step, the PCU 41 may receive the command for operating the selection motor 22, from the microprocessor 40. The new command will be addressed to the block B2 which will automatically carry it out, even if obviously still under the general control of the microprocessor 40.

By means of the signal MOT and the signals RM 1 and RM2, the microprocessor 40 is also capable of directly controlling the motors 21, 22 and 23, by inhibiting the control mechanisms of the motors themselves. More precisely, if the signal MOT is at level 1, the actuation signals M11–M21, M12–M22, M13–M23 are generated directly by the microprocessor 40, without the operative controls by means of the comparators 65 and 67, but by means of the two command signals RM 1 and RM2 which, by way of the logic network 74, transfer their value to the signals for actuation of the motor 21, 22 and 23 being controlled; for example, if the motor being controlled is the carriage drive motor 21, RM1=M11 and RM2=M12.

If, at the same time as MOT=1, the signal POS is also at level 1, those are the commands for keeping the motor stationary.

Figure 12:
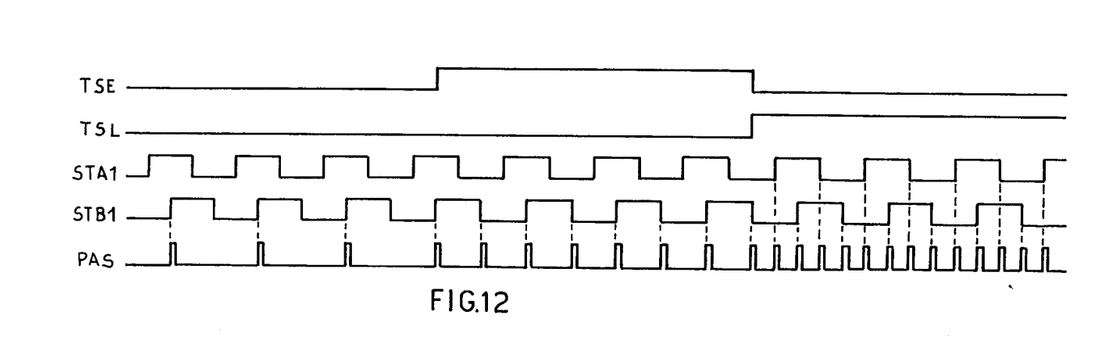
FIG. 12 is a diagram showing the configuration of further signals of the circuit.

The signals RM1 and RM2 also have the function of determining, on entering the logic network 72, whether the signal PAS is to be generated at the rising edge of the strobe signal STB (RM1=RM2) or at the falling edge of the strobe signal STB (RM1 different from RM2); that obviously applies only in the case where the signals TSE and TSL are both at level 0 (FIG. 12).

It will be clear therefore that the circuit 20 according to the invention is capable of actuating an electric motor 21 of a typewriter 25 which is provided with a microprocessor 40 for determining, for the motor 21, the number of elementary rotary movements to be performed in order to reach a given angular position, and, for each of the angular rotary movements, the theoretical time TR for performing same, and in which associated with the motor 21 is a respective trasducer 35, for generating timing or positioning signals ST1 which are indicative of the angular position attained. One of the features of the circuit according to the invention is that, for the motor 21 there is a circuit block B1 which comprises memory means 61 for storing the value of the theoretical time TR and comparison means 65 for comparing the effective time TE for performing the rotary movement, associated with the timing signals, with the theoretical time TR, and for generating a corresponding interrupt signal 1NT 1 for the microprocessor 40, and that data addressing means 48 are provided for directing the data processed by the microprocessor 40 to the block B1.

It will be also clear that the circuit module comprises output means controlled by said comparison means and operative on said motor, wherein said comparison means causes said output means to accelerate said motor independently of any command by the microprocessor if no position signal has been received before the theoretical time TR. Moreover, the microprocessor causes the output means to accelerate or brake the motor for a forcing time TF less than TR and to hold disabled said motor for the remaining time up to TR. The forcing time TF is associated with the effective time TE of the preceding elementary rotation of said motor and the circuit module holds the motor disabled if the position signal is received before the theoretical time TR and before any new command by the microprocessor.

I claim:

1. A circuit for actuating at least an electric motor of an electronic typewriter, wherein the typewriter comprises an electric motor having a shaft performing elementary rotary movements; transducer means associated with said motor for generating position signals of impulse type which are indicative of each elementary rotary movement effected by said shaft; a microprocessor for determining a number of said elementary rotary movements to be effected by said shaft in order to attain a given angular displacement; and a circuit module connected with said microprocessor and with said motor and responsive to each of said position signals for controlling the velocity of said shaft for elementary rotary movement of said shaft; wherein said microprocessor also comprises microprocessor time memory means permanently storing a plurality of values of theoretical times TR associated with said number of said elementary movements and read-out means actuatable for reading-out in said circuit module one of said theoretical times, wherein said plurality of values of said theoretical times TR being provided for performing said number of said elementary rotary movements according to a predetermined law of movement of said shaft along with said given angular displacement; and the combination comprising:

said circuit module comprises a circuit module memory means for storing a theoretical time signal TT associated with a value of said plurality of values of theoretical times TR read-out from said microprocessor time memory means;

timing means responsive to said position signals for determining an evolving time signal CNT indicative of the interval of time elaspsing from a last received position signal along one elementary rotary movement;

comparison menas for comparing said evolving time signal CNT with said theoretical time signal TR and generating an equality signal REF when the evolving time signal CNT is equal with the theoretical time signal TR;

logic means responsive to the position signal and to the equality signal REF for actuating said motor to correct the velocity of said shaft during said one elementary rotary movement;

means for generating a corresponding interrupt signal for the microprocessor, at the end of said one elementary rotary movement; and data addressing means for receiving data processed by said microprocessor in said circuit module, wherein the read-out means of said microprocessor respond to said interrupt signal to generate a new value of said plurality of values of theoretical times TR for another elementary rotary movement following said one elementary rotary movement; and wherein said logic means accelerates said motor during said one elementary movement independently of any command by said microprocessor if the equality signal REF has been received before said position signal as indicative of the end of said one elementary movement.

2. A circuit according to claim 1, wherein said microprocessor comprises means for storing an effective time signal TE associated with the evolving time signal CNT at the end of said one elementary rotary movement in response to said interrupt signal and means responsive to said effective time signal TE for generating a forcing time TF less than said theoretical time TR and reading-out said effective time into said circuit module, and wherein said logic means cause actuation of said electric motor to accelerate or decelerate, respectively, said shaft during another elementary rotary movement which follows said one elementary rotary movement in response to a new theoretical time TR and said forcing time signal TF as calculated after said one elementary rotary movement.

3. A circuit according to claim 2, wherein said circuit module memory means comprise a first register for storing said theoretical time TR, said timing means comprise a counter actuatable for counting clock pulses in response to the position signal and generating said evolving time signal CNT, and said comparison means comprise a first comparator connected to said first register and said counter for generating said equality signal REF, wherein said circuit module further comprises a second register to store said forcing time TF and a second comparator connected to said second register and said counter and generating another equality signal COR to indicate that the elasped time signal CNT is equal to said forcing time signal TF, wherein said logic means comprise means responsive to said other equality signal COR of said second comparator to hold disabled said motor for a given remaining time, wherein said remaining time is included between said forcing time TF and said theoretical time TR if the equality signal from said first comparator is received before the position signal fromsaid transducer means which is indicative that the theoretical time TR is less than the effective time TE, and wherein said remaining time is included between said forcing time TF and said effective time TE if said position signal from said transducer means is received without any receipt of said equality signal from said first comparator.

4. A circuit according to claim 3, wherein said logic means further provide gate means and flip-flop means connected with said equality signal REF from said first comparator and with said other equality signal COR from said second comparator to accelerate directly said motor during said one elementary movement in response to said equality signal of the first comparator received before receipt of said position signal associated with the said end of said one elementary rotary movement.

5. A circuit according to claim 1, wherein said circuit module holds said electric motor in a disabled status for a given time on the basis of an intermediate count during said one elementary movement and wherein the length of said disabled status for a given time on the basis of an intermediate count during said one elementary movement and wherein the length of said disabled status depends on said theoretical time TR of said elementary movement and given forcing time read-out from the microprocessor.

6. A circuit according to claim 1, wherein said circuit module comprises a register for storing commands received from the microprocessor, and wherein said means for generating a corresponding interrupt signal for the microprocessor comprises a logic network connected with said register and responsive to one of said commands and to said position signal for generating said interrupt signal synchronous with said position signal.

7. A circuit according to claim 1 wherein said circuit actuates other motors, wherein said microprocessor determines said number of elementary rotary movements and said theoretical time TR for the other motors, further comprising other circuit modules substantially similar to said circuit module and wherein all of said circuit modules and the data addressing means are integrated into a single component.

8. A circuit according to claim 7, wherein the typewriter comprises a carriage which is movable parallel to a platen roller and a character-carrying disc mounted rotatably on the carriage, wherein a first of the motors controls the displacement of the carriage, a second of the motors controls the rotary movement of the character-carrying disc, and a third of the motors controls the rotary movement of the platen roller.

9. A circuit according to claim 1, wherein the circuit module memory means comprise a first register and the comparison means comprise a comparator connected to the first register and to a counter actuated by the position signals.

10. A circuit according to claim 1, wherein said circuit actuates other motors, wherein said microprocessor determines said number of elemetary rotary movements and said theoretical time TR for the other motors, further comprising other circuit modules substantially similar to said circuit module, wherein said data addressing means comprise a buffer capable of receiving data and addresses transmitted from the microprocessor, an address register connected to the buffer for receiving the addresses transmitted from the microprocessor and an address decoder connected to the address register and to all of said circuit modules.

11. A circuit according to claim 10, wherein said buffer is also connected to each of said circuit modules for transferring the theoretical time TR and other data to said circuit modules.

12. A circuit according to claim 1, wherein said electric motor is a direct current motor and is powered in a switching mode, wherein a forward or reverse command alternates with a short-circuit or disabling command, and wherein said microprocessor determines the various condition of said motor on the basis of the comparison operations carried out by said comparison means.

13. An electronic circuit for actuating a plurality of electric motors of an office typewriter comprising a microprocessor which is capable of determining for each of the motors the direction of rotation and the angular amplitude required to attain a given angular position and calculating for each rotary movement a number of elementary rotary movements to be effected in order to attain said given angular position and, for each elementary rotary movement, a theoretical time signal TR for performing said elementary rotary movement; a plurality of transducers associated with said motors for generating on a plurality of lines position signals which are indicative of the angular position attained by said motors; and a plurality of circuit modules, wherein each circuit module comprises circuit module memory means for storing the value of said theoretical time signal TR; timing means connected with one line of said plurality of lines and responsive to said position signals for determining an evolving time signal CNT indicative of the interval of time elapsing from the time of receipt of a last position signal along said elementary rotary movement; comparison means for comparing the evolving time signal CNT with the theoretical time signal TR; output means controlled by said comparison means and operative on one of said plurality of electric motors, wherein said comparison means causes said output means to accelerate said one motor independently of any command by the microprocessor if a position signal has not been received in said one line of said plurality of lines before the theoretical time TR; and means for generating a corresponding interrupt signal associated with said position signal received on said one line of said plurality of lines for causing said microprocessor to read-out on said circuit module said theoretical time signal TR and a control signal for controlling the acceleration and deceleration of said motor.

14. A circuit according to claim 13, wherein each of said electric motors is a direct current motor and is powered in a switching mode, wherein each one of said circuit modules further comprises means for generating a corresponding interrupt signal for the microprocessor associated with receipt of said position signal, wherein the control signal of said microprocessor causes said output means to accelerate or brake each of said motors for a forcing time TF less than the theoretical time TR and to hold disabled said each of said motors for a remaining time up to TR, wherein said forcing time TF is associated with the effective time TE of a preceding elementary rotation of said each of said motors and wherein the comparison means of each of said circuit modules cause said output means to hold an associated motor disabled if an associated position signal is received before the theoretical time TR and before any new control signal by said microprocessor.

* * * * *